(12) United States Patent
Kurtin

(10) Patent No.: US 9,921,765 B2
(45) Date of Patent: Mar. 20, 2018

(54) PARTIAL SNAPSHOTS IN VIRTUALIZED ENVIRONMENTS

(71) Applicant: AVAST Software s.r.o., Prague (CZ)

(72) Inventor: Petr Kurtin, Otrokovice (CZ)

(73) Assignee: AVAST SOFTWARE S.R.O. (CZ)

( * ) Notice: Subject to any disclaimer, the term of this patent is extended or adjusted under 35 U.S.C. 154(b) by 74 days.

(21) Appl. No.: 14/868,194

(22) Filed: Sep. 28, 2015

(65) Prior Publication Data

US 2016/0019002 A1 Jan. 21, 2016

Related U.S. Application Data

(63) Continuation-in-part of application No. 14/581,494, filed on Dec. 23, 2014.

(60) Provisional application No. 61/920,999, filed on Dec. 26, 2013.

(51) Int. Cl.
*G06F 12/00* (2006.01)
*G06F 3/06* (2006.01)
*G06F 17/30* (2006.01)

(52) U.S. Cl.
CPC ............ *G06F 3/0619* (2013.01); *G06F 3/065* (2013.01); *G06F 3/0665* (2013.01); *G06F 3/0689* (2013.01); *G06F 17/30235* (2013.01)

(58) Field of Classification Search
CPC ........................................................ G06F 12/00
USPC ............................................................ 711/114
See application file for complete search history.

(56) References Cited

U.S. PATENT DOCUMENTS

| | | | | |
|---|---|---|---|---|
| 7,254,682 | B1 * | 8/2007 | Arbon | G06F 11/1435 711/161 |
| 7,886,119 | B1 * | 2/2011 | Cameron | G06F 3/0611 711/114 |
| 2003/0158861 | A1 * | 8/2003 | Sawdon | G06F 11/1435 |

OTHER PUBLICATIONS

Volume Shadow Copy Service, https://technet.microsoft.com/en-us/library/ee923636(d=printer,v=ws.10).aspx, pp. 1-12, Accessed Dec. 28, 2015.

* cited by examiner

*Primary Examiner* — Tuan Thai
*Assistant Examiner* — Gautam Sain
(74) *Attorney, Agent, or Firm* — Husch Blackwell LLP

(57) ABSTRACT

Systems and methods create partial snapshot for a volume. Files and folders are identified for inclusion in the partial snapshot. In response to writing updated data to the volume, a volume snapshot layer can determine of the updated data is associated with a file or folder in the partial snapshot. If the file or folder is included in the partial snapshot, original data at the volume location is read from the volume and written to the partial snapshot.

18 Claims, 13 Drawing Sheets

PARTIAL SNAPSHOTS IN VIRTUALIZED ENVIRONMENTS

CROSS-REFERENCE TO RELATED APPLICATIONS

This application is a continuation-in-part of and claims the priority benefit of U.S. patent application Ser. No. 14/581,494 filed on Dec. 23, 2014, which claims the priority benefit of U.S. Provisional Patent Application Ser. No. 61/920,999 filed on Dec. 26, 2013. The disclosures of all above-referenced applications are incorporated herein by reference in their entirety.

FIELD OF THE INVENTION

This disclosure relates generally to systems and methods for storage management, and more particularly, to using partial snapshots in virtualized environments.

BACKGROUND

A virtual machine is software implementation of a computing machine. A virtual machine can be used to divide a single host computer system into multiple virtual machines, where each virtual machine runs a separate instance, or image, of an operating system (OS). A virtual machine is separate, or isolated, from other virtual machines and may also be isolated from hardware available on a host system. For example, instances of virtual machines can have separate file systems, separate users, separate applications, and separate processes. In other ways, however, the instances of the virtual machines are not separate and can share some resources of the host. For example, the instances of the virtual machines can share the memory, processors, network cards, hard drives, and other hardware of the host computer system.

Virtual machines haven proven useful in many environments. For example, virtual machines can be used to provide different operating systems on a computing system. Further, virtual machines can be used to provide a secure environment in which to execute untrusted software or to browse untrusted web sites. The virtual machine in such cases can be isolated from the main file system and hardware of the underlying computing system. Thus any corruption caused by malware or improperly functioning software is limited to the virtual machine.

Virtual machines typically access a virtual disk that appears to the virtual machine as a physical disk. A virtual disk is typically a copy of one or more file systems stored on a physical disk (or another virtual disk). In conventional systems, the virtual disk typically has a copy of all of the files in a file system. Thus the copy of the file system on a virtual disk may contain more files than are necessary for the virtual machine's intended purpose. Such unnecessary files may include files containing sensitive data such as passwords, financial information, personal information etc.

BRIEF DESCRIPTION OF THE DRAWINGS

For a better understanding of the inventive subject matter, reference may be made to the accompanying drawings in which.

DETAILED DESCRIPTION

Figure 1:
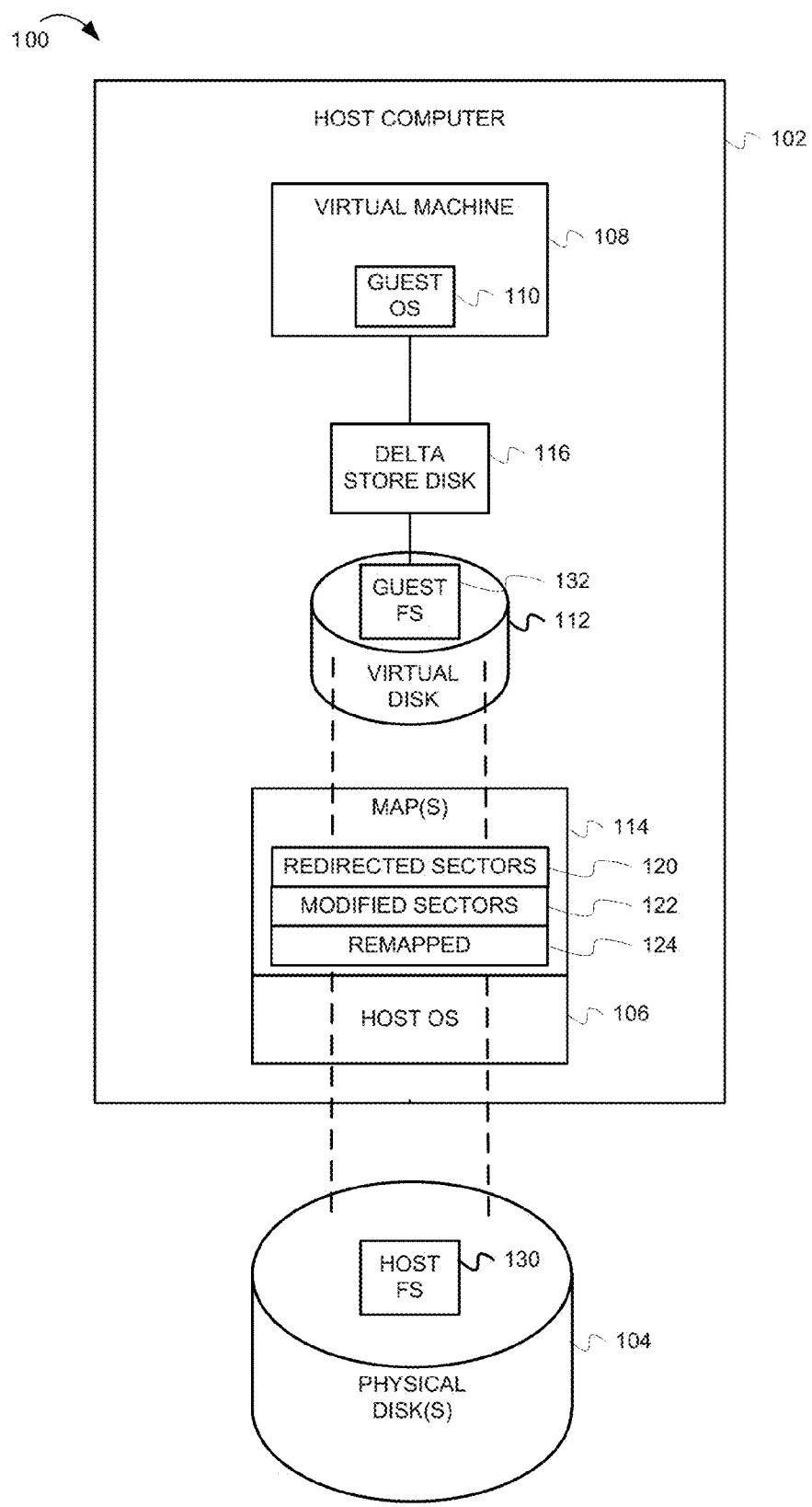
FIG. 1 is a block diagram of a system according to embodiments of the invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Described herein are systems and methods for creating virtual disks for virtual machines. The virtual disk can be created from marked folders such that files and folders containing sensitive data or data not necessary for the purpose of a virtual machine using the virtual disk can be omitted from the virtual disk. In addition, systems and methods for creating snapshots (copies at a point in time) of disk volumes are described herein. The systems and methods can leverage the techniques and data structures used to create virtual disks. Unlike conventional snapshot techniques that create snapshots of entire volumes, the systems and methods described herein can create snapshots that are limited to files and folders of interest.

The detailed description below comprises three sections. The first section references FIGS. 1-6 and provides a description of creating virtual disks for virtual machine according to embodiments. The second section references FIGS. 7-12 and provides a description creating, writing and reading partial snapshots of disk volumes according to embodiments. The third and final section references FIG. 13 and provides a description of an example system in which embodiments may execute.

I. Selective Disk Volume Cloning for Virtual Disk Creation

FIG. 1 is a block diagram of a system 100 according to embodiments of the invention. In some embodiments, system 100 includes host computer 102 coupled to at least one physical disk 104. Host computer 102 may be any type of computer system, including personal computers, server computers, mainframe computers, laptop computers, tablet computers, and other devices such as smart phones, MP3 players, personal digital assistants, etc. Host computer 102 runs a host operating system 106. Host operating system 106 may be any multitasking operating system including various versions of the UNIX, Linux, Windows and mainframe operating systems. The embodiments are not limited to any particular host operating system.

Physical disk 104 may by any type of persistent storage system, including hard drives, optical drives, network attached storage etc. Physical disk may include one or more partitions, volumes etc. Physical disk 104 includes a host file system 130. In some embodiments, the file system may be NTFS (New Technology File System). However the embodiments are not limited to NTFS and other types of file systems may be used and are within the scope of the inventive subject matter.

Host operating system 106 may be configured to implement a virtual machine 108. Virtual machine 108 may execute a guest operating system 110. Guest operating system 110 may be the same type of operating system as host operating system 106 or it may be a different operating system.

Guest operating system 110 and applications running on virtual machine 108 may access virtual disk 112. In some embodiments, virtual disk 112 may be a software implemented disk that includes a guest file system 132. Virtual disk 112 can be a copy of some or all of physical disk 104. Alternatively, virtual disk 112 may map regions of the virtual disk to some or all of disk 104. The contents of virtual disk 112 may be determined as described in detail below with reference to FIGS. 3-5.

Maps 114 describe the mapping of sectors or regions from physical disk 104 to virtual disk 112. In some embodiments, maps 114 include three types of maps to describe the mapping. A first mapping specifies redirected sectors 120. A second mapping specifies modified sectors 122. A third mapping specifies remapped sectors 124. When virtual machine 108 reads or writes a sector from virtual disk 112, it can use the maps to obtain the requested data.

Redirected sectors map 120 comprises a sector mapping for files that exist on host file system 130 and are to be accessible on guest file system 132. In order to make a file visible on guest file system 132 to virtual machine 108 (e.g. C:\Windows\notepad.exe), the system determines from file system data where the file's file system record is stored, and which sectors are occupied by the file. In NTFS embodiments, the system determines where the file's master file table (MFT) record is stored. The sectors are marked as redirected in guest file system 132. Later, when virtual machine 108 wants to read the sectors for the file, redirected sectors map 120 can be read to determine whether or not the read should be redirected to the host file system 130.

Modified sectors map 122 maps sectors on guest file system 132 that have changed as a result of changes to files or folders on guest file system 132. In some embodiments, this map contains a pair of sector number and sector contents. When virtual machine 108 reads a sector that has been changed, this map is used to return the modified sector instead of the host sector. When a new file is created on guest file system 132, a file system entry is created for the file and the sectors associated with the file are indicated as modified sectors in modified sectors map 122. The file system entry is then inserted into a folder (referred to as a parent folder). The sector changes associated with insertion of the file into the parent folder are also saved in modified sectors map 122.

In NTFS embodiments, an MFT record is created for the file and the files sectors are indicated as modified sectors. The MFT record is inserted in a parent folder. The parent folder's $INDEX_ALLOCATION structure is modified to reflect the insertion of the file. The sector changes associated with the changes to the $INDEX_ALLOCATION structure are saved in modified sectors map 122.

Remapped sectors map 124 maps sectors for new files that are created on guest file system 132 that may actually exist at an external location such as a different volume, a different disk or a different network. Sectors for such files are reserved on guest file system 132. When virtual machine 108 reads such sectors, these sectors are read directly from the file stored on the external location. The difference between remapped sectors map 124 and redirected sectors map 120 is that remapped sectors are not stored on physical disk 104, but instead are store at an external location.

Delta store 116 stores changes that are made to the virtual disk 112 that are local to virtual machine 108. In other words, delta store 116 stores data associated with changes that are visible on guest file system 132, but are not made visible on host file system 130.

It will be appreciated by one of skill in the art having the benefit of the disclosure that although one virtual machine, virtual disk and physical disk are illustrated in FIG. 1, a typical computer system can, and typically will, include more than one virtual machine, virtual disk or physical disk. Such configurations are within the scope of the inventive subject matter.

Figure 2:
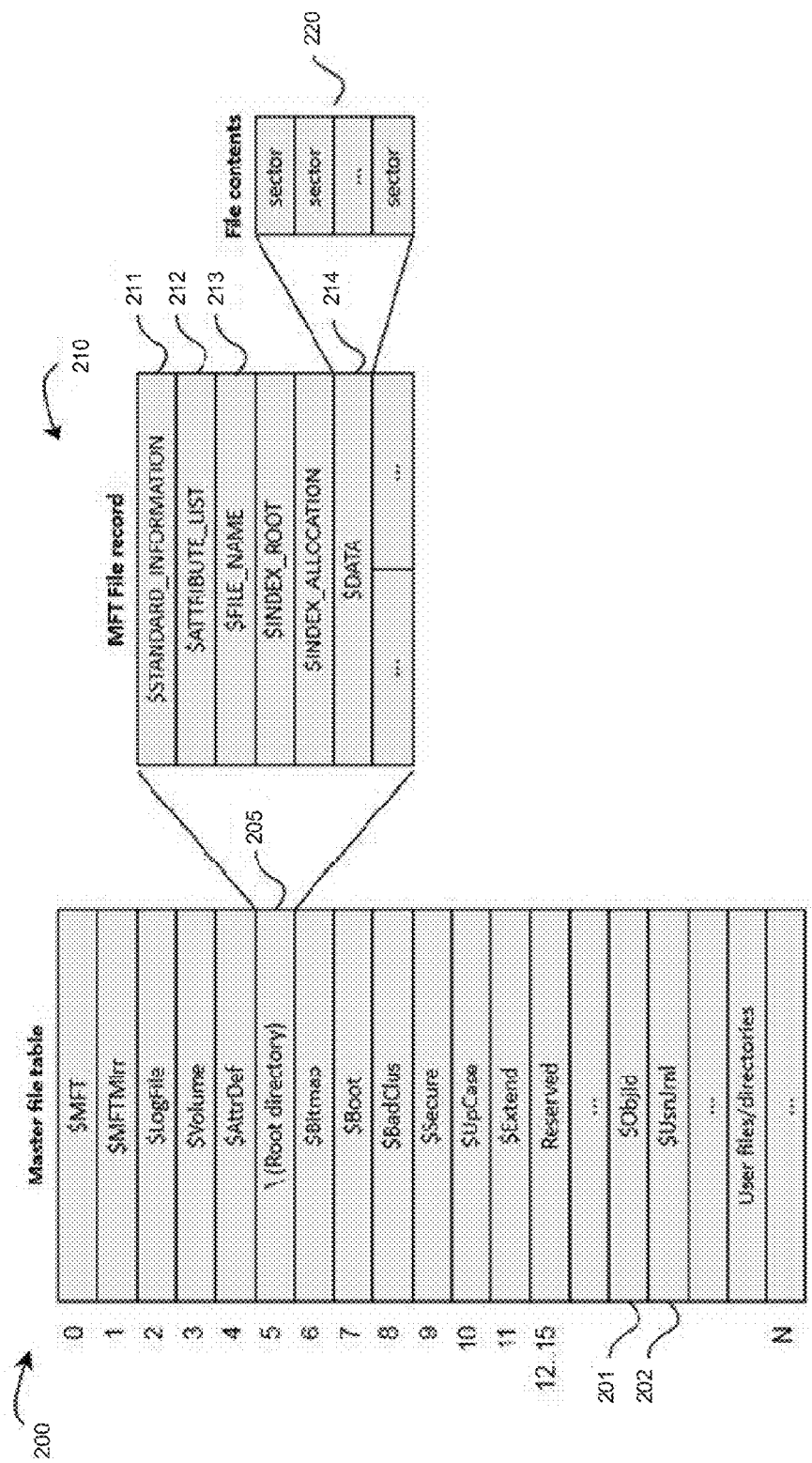
FIG. 2 is a block diagram illustrating data structures for an NTFS file system used in embodiments.

As noted above, some embodiments utilize an NTFS file system. FIG. 2 is a block diagram illustrating data structures used in an NTFS file system. A basic component of the NTFS volume structure is MFT 200. It is implemented as an array of MFT file records. Usually, each MFT file record corresponds to a different file. The first several MFT records are reserved for NTFS itself and their names begin with a dollar sign ($). They describe e.g. volume name ($Volume record), free/occupied sectors on the volume ($Bitmap record), list of object identifiers ($ObjId record), USN database ($UsnJrnl record), etc. Root directory 205 (also known as "\"; for example, "C:\") contains an index of the files and directories (i.e., MFTs) stored in volume root. MFT file record 210 can have several attributes which describe information about the record. Such attributes may include one or more of the following:

$STANDARD_INFORMATION 211 contains file attributes, time stamps.

$ATTRIBUTE_LIST 212 may be present when all MFT attributes can't fit into one MFT record.

$FILE_NAME 213 contains a file name $DATA 214 describes which sectors are occupied by a file.

$INDEX_ROOT, $INDEX_ALLOCATION are used for directories and contains a list of nested files for such folders.

Figure 3:
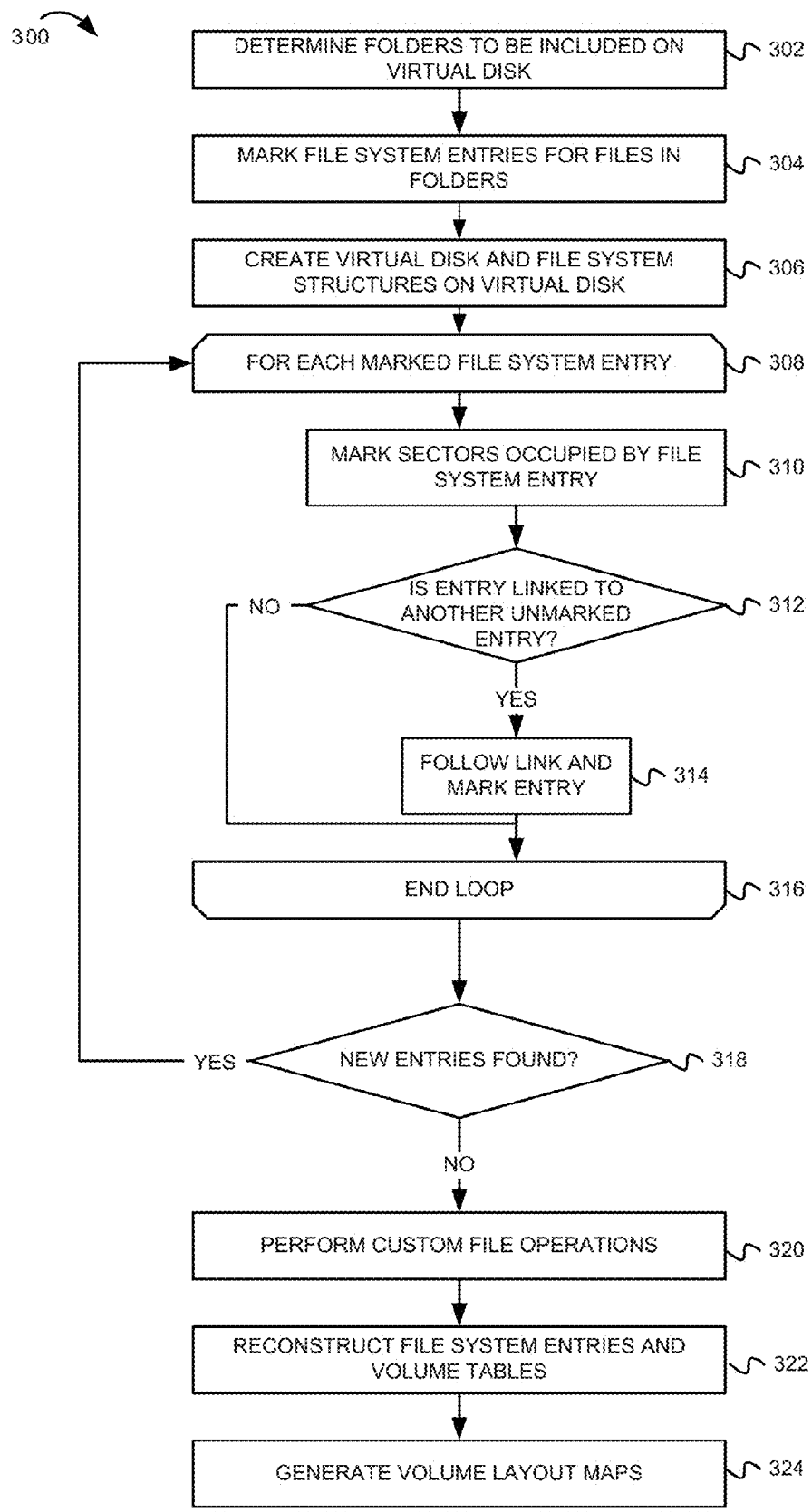
FIG. 3 is a flowchart describing a method for creating a virtual disk according to embodiments.

FIG. 3 is a flowchart describing a method 300 for creating a virtual disk according to embodiments. The method may, in some embodiments, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The method illustrated in FIG. 3 is inclusive of acts that may be taken by a system 100 executing an example embodiment of the invention.

Method 300 begins at block 302 with determining folders on a source disk (e.g., physical disk 104) that are to be included in a newly created virtual disk (e.g., virtual disk 112). A user or administrator creating a virtual disk may select a subset of folders in a file system for inclusion on the virtual disk. For example, a user or administrator using a Windows based operating system may select the "program files" and "Windows" folders for inclusion. In some embodiments, selecting a folder indicates that the files in the folder are "trusted." Omission of a folder from the selection indicates that the files and sub-folders in the folder are not to be included on the virtual disk. Such files may contain sensitive data or data that is not necessary for the operations of a virtual machine accessing the virtual disk. In some embodiments, the system may automatically select files or folders that are to be excluded from a guest file system based on a characteristic of the file matching or meeting a predetermined or configurable criterion. For example, a file type (e.g., ".log") may potentially include sensitive information and may be excluded from a guest file system 132 created based on a host file system 130. File names, file types, regular expressions, or lists of files to be excluded may be used to automatically exclude files from a guest file system 132.

At block 304, the system marks file system entries for the files in the folders determined at block 302. Marking the file system entries indicates that the file associated with the file system entry is to be included in the virtual disk. In NTFS embodiments, an NTFS file-system structure is implemented as an array of file records in an MFT. A folder is an index of MFT records organized as a B-tree stored in index (INDX) blocks. In such embodiments, the system parses the INDX blocks of the folders marked for inclusion, reads associated MFT records in the INDX blocks, and marks the associated MFT records to be included in the virtual disk.

At block 306, a virtual disk is created and file system structures are initialized on the virtual disk. In NTFS embodiments, MFT tables, USN (Update Sequence Number) journals, reparse points, object identifiers, unicode tables etc. are created and initialized for the virtual disk. Recreating the file system structures is desirable because copying structures from the source disk may result in copying information regarding unmarked MFT records.

Block 308 is the beginning of a loop that walks through each file system entry marked at block 304. In NTFS embodiments, the loop walks through each marked MFT record.

At block 310, the system marks sectors occupied by the currently considered marked file system entry. In NTFS embodiments, the sectors associated with an MFT record may be described in a $DATA substructure of the current MFT record.

At decision block 312, the system determines if the current file system entry is linked to another unmarked file system entry. In NTFS embodiments, a link may be determined from a $ATTRIBUTE_LIST structure in the MFT record. Alternatively, the MFT record may contain multiple $FILE_NAME structures (referred to as "hard links").

If the check at block 312 determines that a linked file system entry is present, then at block 314 the link is followed and the file system entry is marked for inclusion in the virtual disk. Any newly discovered linked file system entries may be examined in a second pass of the loop.

Block 316 is the end of the loop. If further file system entries exist to be processed, then the method returns to block 308 to process the next file system entry.

At block 318, a check is made to determine if new file system entries were discovered during a first pass of the loop. If so, the method returns to block 308 to perform a second pass of the loop to process the linked file system entries.

Figure 4:
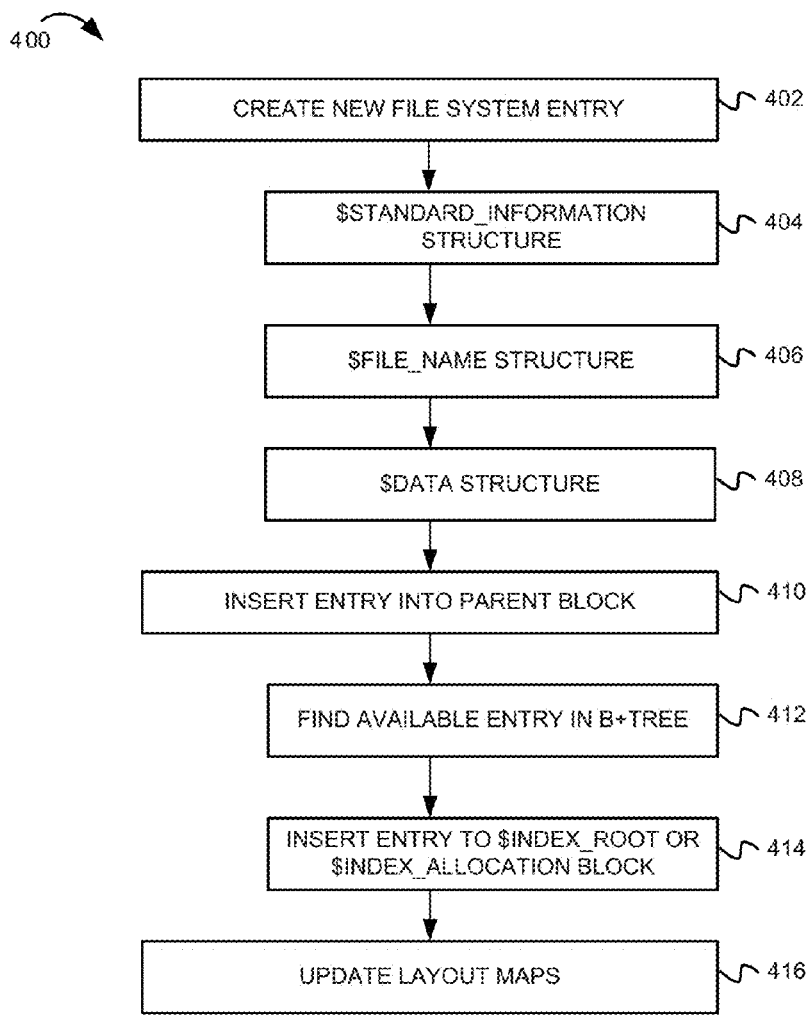
FIG. 4 is a flowchart describing a method for inserting a new file into a virtual disk file system according to embodiments.

After the marked file system entries have been processed, the method proceeds to block 320, where custom file operations may be performed in some embodiments. Such operations may include inserting new files that exist on different sources such as different volumes, networks etc. The sectors associated with such files may be marked for inclusion on the virtual disk. A file identifier may identify the new file in cases where the new file is on the same volume as the source disk. Alternatively, a file path may identify the new file in cases where the new file is on a different source, such as a network attached storage system. FIG. 4 provides further details on the processing performed at block 320.

At block 322, file system entries and tables for the virtual disk are reconstructed based on the marked entries and sectors. In NTFS embodiments, the MFT and $Bitmap tables can be reconstructed to reflect changes in the guest file system 132.

At block 324, the method generates volume layout maps (e.g., maps 114) for the virtual disk. As noted above, the layout maps can include maps for redirected sectors, modified sectors, and remapped sectors.

FIG. 4 is a flowchart describing a method 400 for inserting a new file into a virtual disk file system according to embodiments. Method 400 is described in terms of NTFS file system operations. Those of skill in the art having the benefit of the disclosure will appreciate that the operations described in method 400 may be applied to other file system types. Method 400 begins at block 402 with creating a new MFT entry in the virtual disk file system. Operations 404-408 are executed to create the new MFT entry.

At block 404, a $STANDARD_INFORMATION structure is populated for the newly created MFT record. The $STANDARD_INFORMATION structure includes file time information (e.g., create, modify, access date and time), file access permissions, file ownership information etc.

At block 406, a $FILE_NAME structure is populated for the newly created MFT record. The $FILE_NAME structure can include a text string for the name of the file and a reference to the parent folder for the file.

At block 408, a $DATA structure is populated for the newly created MFT record. The $DATA structure contains the data for the file.

At block 410, the newly created MFT entry is inserted into the parent INDX block to link the MFT entry with a folder. Operations 412 and 414 are executed to insert the MFT entry into the parent INDX block.

At block 412, the method finds a new place in the sorted B+tree to store the newly created MFT entry.

At block 414, the method inserts the newly created MFT entry into $INDEX_ROOT at $INDEX_ALLOCATION block depending on the size of the folder the newly created MFT entry is inserted into.

At block 416, the layout maps 114 may be modified according to the changes resulting from the execution of method 400.

Figure 5:
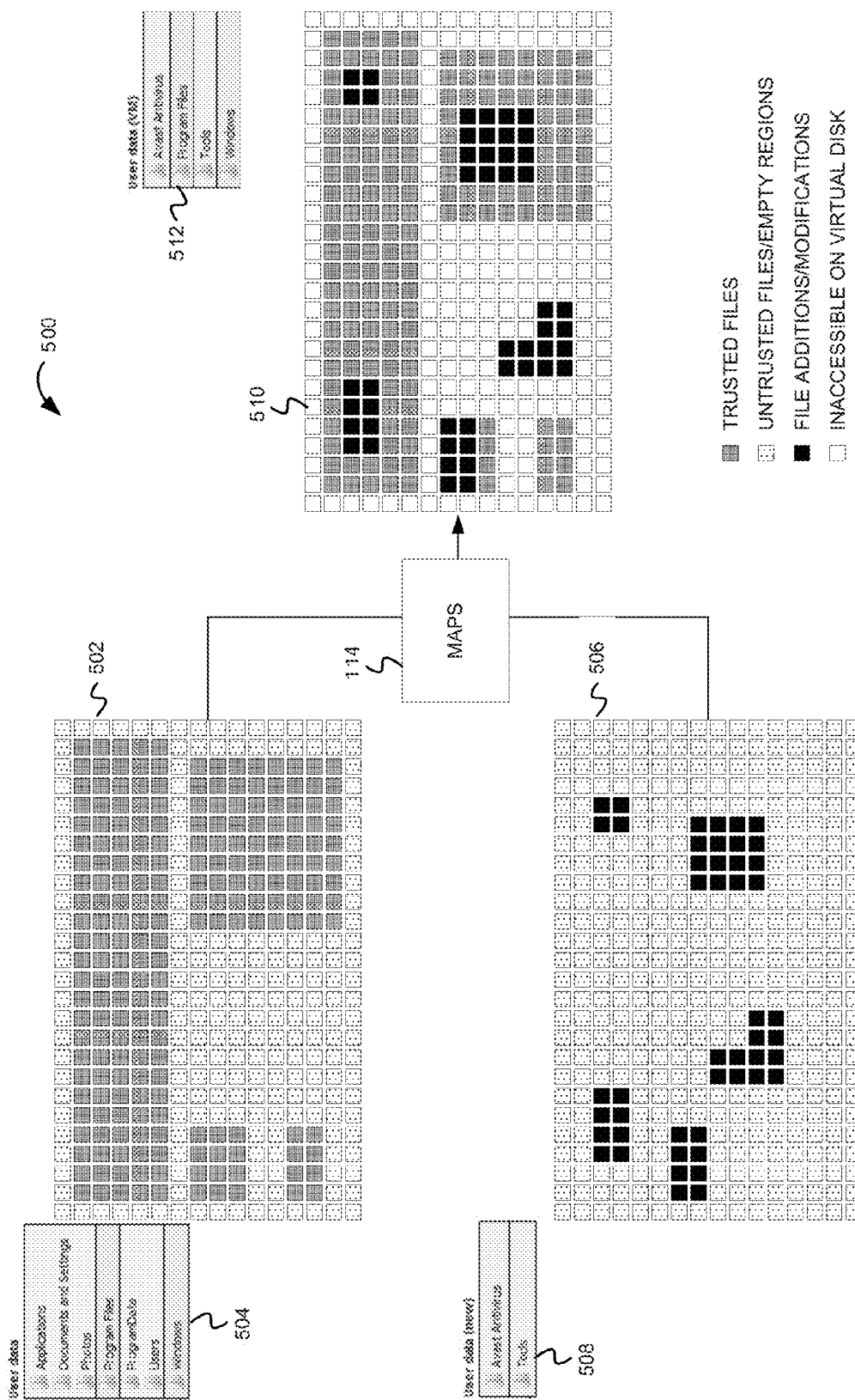
FIG. 5 is a block diagram illustrating an example layout of a virtual disk created according to embodiments.

FIG. 5 is a block diagram illustrating an example layout of a virtual disk created according to embodiments. Region map 502 is an example map that represents regions of a physical disk (e.g., physical disk 104). A folder list 504 illustrates folders on the physical disk. Two folders are shaded ("program files" and "Windows") in folder list 504. In the example illustrated in FIG. 5, these two folders have been designated as trusted. The gray shaded blocks in region map 502 represents disk regions (i.e., sectors) associated with the designated trusted files and folders. The remaining crosshatched areas of region map 502 represent either regions of the physical disk that are unused or associated with untrusted files.

Region map 506 is an example map that represents regions of the physical disk that have been changed since the creation of a virtual disk based on physical disk 104. The black areas in region map 506 represent changes regions of the disk due to file creation or modification of trusted files. In the example illustrated in FIG. 5, the region map is changed due to the addition of folders in folder list 508 to the virtual disk.

Region map 510 is an example map that illustrates the operation of methods 300 that creates the virtual disk and method 400 that performs custom operations such as file creation or modification of trusted files. The changes in trusted files and folders in the file system on the physical disk are merged as illustrated in the example region map 510. Blank areas of region map 510 are inaccessible to a virtual machine using the virtual disk represented by region map 510. These blank areas represent regions associated with untrusted files and folders. Folder list 512 indicates the folders on the virtual disk and includes the selected folders from folder list 504 and the newly added folders in folder list 508.

Various embodiments for the above described systems and methods can provide advantages over tradition methods for creating virtual disks. For example, the operating system stored on a virtual disk for a virtual machine can be minimal, i.e., without software that is not necessary for the virtual machines purpose. The virtual disk may contain clean (e.g., trusted or approved) files or used defined files (e.g., new/ modified files). Further, the virtual disk for the virtual machine can be created such that it does not include sensitive data such as password data, financial data, or other sensitive personal or proprietary information. Additionally, creation of a virtual disk may take less time than traditional methods. Finally, the output layout file (i.e., maps 114) for the virtual disk may be small (e.g., less than one megabyte).

The following examples illustrate the operation of the above-described systems and methods in an NTFS environment.

Example 1 Virtual Disk Structure

Assume that a Windows folder on a host file system 130 is to be accessible on virtual machine 108. A main NTFS structure 200 (including records 0-15) is created on guest file system 132. Various NTFS structures created on guest file system 110 remain the same (e.g. $Volume—volume name, $BadClus—list of bad volume clusters, $UpCase—uppercase character mapping) on guest file system 132. These structures, namely their sectors, will be marked as redirected and appear in redirected sectors map 120. However, some structures must be modified (e.g. $ObjId 201 contains list of file identifiers on host file system 130 that may not exist on guest file system 132, therefore such entries are removed and do not appear in guest file system 132. Similarly, $UsnJrnl 202 records file changes made on host file system 130 when a new file is created, deleted, changed, etc. Therefore such entries are also removed from the NTFS structure 200 on guest file system 132. In some embodiments, these changes, namely their sector contents, will be stored into modified sectors map 122. Next, the files and folders in the Windows folder are processed.

The system finds the MFT entry for Windows folder and marks it as redirected (because it exists on host file system 130). Additionally, the MFT attributes for the Windows folder are read and marked as redirected.

Since the Windows folder is a folder, it contains $INDEX_ROOT and $INDEX_ATTRIBUTE attributes in MFT file record 210 which link all nested files in the Windows folder. The system walks through this list and all files appearing in the list are marked as redirected (namely, the file's MFT and sectors 220 stored in MFT $DATA 214 attribute).

NTFS $Bitmap contains a list of sectors which are occupied on the volume. Since guest file system 132 occupies only a subset of sectors on host file system 130, the $Bitmap list on guest file system 132 can be modified to reflect the changes. These changes will be written to modified sectors map 122.

As can be seen from the above, in some embodiments, a whole virtual disk structure can be described using redirected sectors map 120 and modified sectors map 122.

Example 2 Virtual Disk Structure with Additional File Operations

Figure 6:
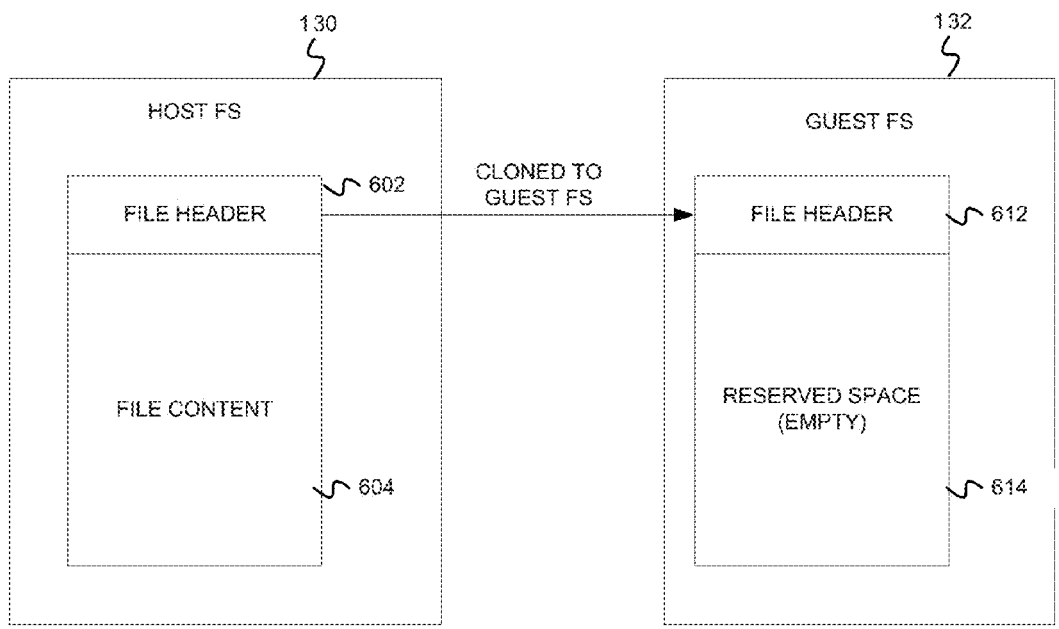
FIG. 6 is a block diagram illustrating reconstructing a file from a host file system to a file on a guest file system.

It is usually the case that some additional file operations on guest file system 132 will be performed as part of creating a virtual disk 112. For example, some tools may be preinstalled, Windows registry settings replaced, sensitive files may be deleted from Windows folders (e.g., logs, etc.). Guest file system 132 can be reconstructed as described above in FIGS. 2-5 and in Example 1. FIG. 6 illustrates an example of creating a new file on a guest file system 132 that is being reconstructed from a host file system 130. When creating a new file, an MFT structure is created for the file and marked as modified. A file header 602 for the file on the host file system 130 is cloned as file header 612 on the guest file system 132. Additionally, the system reserves sectors 614 for this file and marks the sectors as redirected to corresponding sectors 604 containing the file content of the external file on the host file system 130. Thus the contents of the file on the guest file system 132 actually resides in the sectors 604 of the external file. Upon a read of the file on the guest file system 132, the file read operation is redirected from the guest file to the host file having the content. The guest read operation thus actually receives the data from the host file system. From the point of the of the source of the read request on the guest operating system 110, it appears that the data is coming from the file in the guest file system 132. The source in the guest operating system 110 is not aware (nor does it need to be aware) that the data actually resides on the host file system 130. In the case of replaced registry files, these files are already exist on guest file system, hence it is not necessary to create their MFTs. However, the system redirects their MFT $Data sectors to external files.

As can be seen from this example, in some embodiments a whole virtual disk 112 structure can be described by redirected sectors map 120, modified sectors map 122 and remapped sectors map 124.

Example 3 Use of Virtual Disk Structure

One of the many applications of virtual disk technology is in the area of computer security and anti-virus protection. Examples of such products include the Avast! series of products available from Avast Software. In some embodiments, a computer security product can cause the creation of a virtual machine and a virtual disk that maps the Windows folder to virtual machine, removes sensitive files, installs additional tools (for malware analysis), or installs a secured web browser. The computer security software can also replace Windows registry settings with a new user's settings, for example, the user's own user profile from a host machine. Services can be disabled, sensitive settings removed, etc in the guest environment. New registry settings in the virtual machine can be desirable, because when the virtual machine's Windows OS is starting, it is typically booted directly into the user profile. This is desirable because the user's default profile could be protected by a password that isn't known to the security product, or it may link to non-exist files on guest file system 132, etc. When Windows OS on the virtual machine 108 writes data to virtual disk 112, the data can be written to delta store disk 116 (FIG. 1).

As can be seen from the above, a whole virtual disk structure can be described by redirected sectors map 120, modified sectors map 122 and remapped sectors map 124.

II. Partial Snapshots in a Virtualized Environment

This section provides a detailed description of embodiments that create partial snapshots of a disk volume. In general, a snapshot is an image or copy of a volume at a given point in time. Even though the contents of the volume can change, the snapshot volume preserves the content of the original volume as it existed at the point in time the snapshot was taken. The snapshot can be useful to recover from malware attacks. For example, some malware encrypts a user's files and then requires the user to pay money to decrypt the files. If the user doesn't pay, there may be no way to decrypt the user's files as the decryption keys are only accessible on servers known to the malware developer. In such cases, snapshots can be useful in recovering the files as they existed prior to encryption by the malware. As noted above, unlike conventional snapshot techniques that create snapshots of entire volumes, the systems and methods described herein can create partial snapshots that are limited to files and folders of interest on a volume, and exclude files and folders that are not of interest. For example, the partial snapshots can be limited to the files that are selected to be visible on a virtual disk 112 (FIG. 1) accessible to a guest operating system 110 (FIG. 1) as described above in Section I. As a result, the partial snapshots created according to the systems and methods disclosed herein use less storage space than conventional snapshots.

Figure 7:
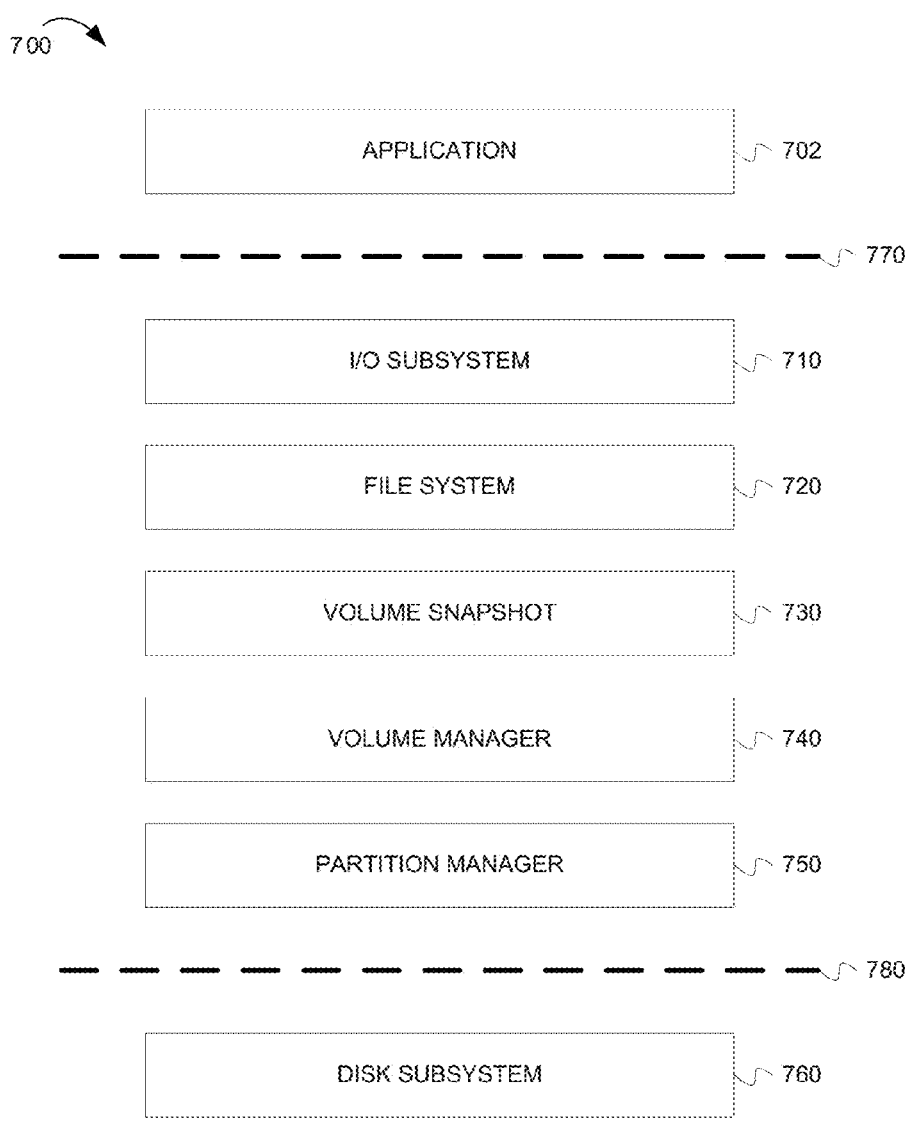
FIG. 7 is a block diagram illustrating a storage stack in which embodiments of the inventive subject matter can operate.

FIG. 7 is a block diagram illustrating a storage stack 700 in which embodiments of the inventive subject matter can operate. Storage architecture 700 is representative of a layered storage architecture that is associated with versions of the Microsoft Windows® Operating System. However, the embodiments described herein may operate in the storage architectures of other operating systems such as Linux, versions of the UNIX operating system, iOS and Android operating systems. The storage architecture can include an application layer 702, Input/Output (I/O) subsystem 710, file system 720, volume snapshot layer 730, volume manager 740, partition manager 750, and disk subsystem 760. Portions of the storage stack between dashed lines 770 and 780 may be layered drivers that typically execute within the context of the operating system.

Application layer 702 issues requests to I/O subsystem 710 to read and write data of one or more files.

I/O subsystem 710 converts the file read and write requests to an I/O request and sends the request to file system layer 720.

The file system (FAT32, NTFS, . . . ) converts the I/O request to a volume I/O request. The file system knows where the file is physically stored on the volume, so it converts file offset to a volume offset.

Volume snapshot 130 monitors the volume read I/O requests and under certain conditions, the volume snapshot 130 can modify the requests. Examples of such modification include redirecting the request to a different volume offset, splitting the request into multiple requests, combining requests, encrypting requests or data for requests, etc.).

Volume Manager 140 presents volumes (e.g., C:, D:) to the upper layers of the storage architecture.

Partition Manager 150 manages disk partitions (i.e. one hard drive can have multiple volumes).

The lowest layer is Disk Subsystem layer 160, which reads data from and writes data to the hard drive and returns data back to the application 100 through the upper layers of the storage architecture.

Figure 8:
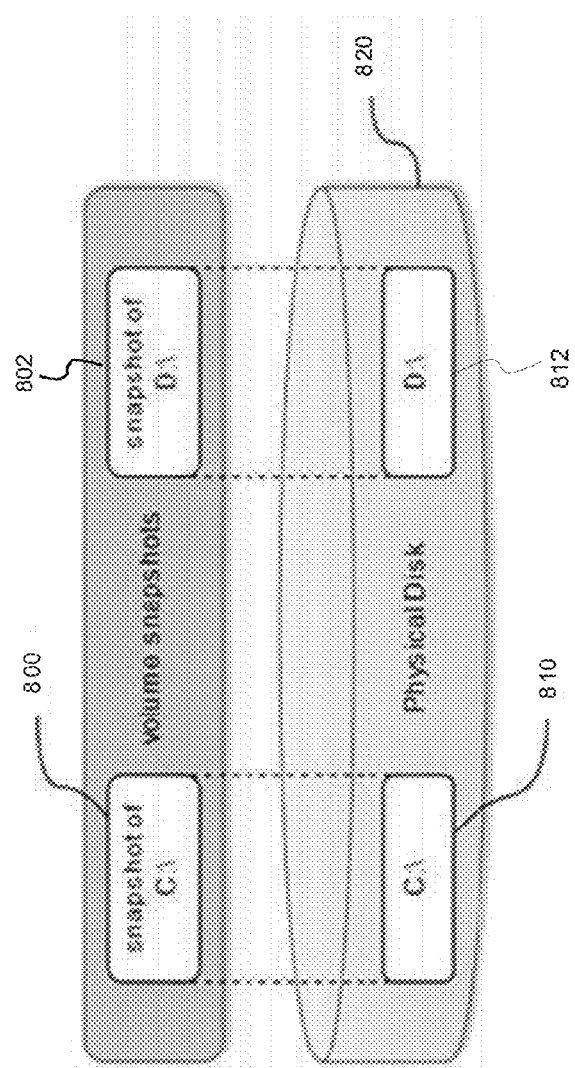
FIG. 8 is a block diagram illustrating snapshots of physical disk volumes.

FIG. 8 is a block diagram illustrating snapshots of physical disk volumes. In the example illustrated in FIG. 8, a physical disk 820 is partitioned into two volumes, volume C: 810 and volume D: 812. Two snapshots have been created, snapshot 800 for volume C: 810 and snapshot 812 for volume D: 812. When a snapshot (800, 802) is created, the source volume (810, 812) can be analyzed to determine the attributes of the source volume. In some embodiments, the attributes that are analyzed can include combinations of one or more of:

volume file-system type (e.g., FAT12/FAT16/FAT32, NTFS or ReFS)
volume unique identifier (volume GUID)
volume physical offset and length
disk number (in case the computer has multiple disks)
sector and cluster size The attribute information gathered is then used to create the corresponding volume snapshot. In some embodiments, there is a 1-to-1 mapping between the attributes of the source volume and the volume snapshot.

In some embodiments, the volume snapshot includes three files, a snapshot file, a layout file, and a control file. The files can be stored on a physical volume, for example, the physical volume where the snapshot software is installed. The files can be stored on any volume that is accessible by the volume snapshot layer 730. The snapshot file provides storage space for the original data blocks of the volume. In some embodiments, the snapshot file is a temporary file. The layout file contains maps for sectors included in the snapshot. In some embodiments, the maps include a redirected sector map, a modified sector map, and a remapped sector map. These maps can describe what sectors are monitored by the volume snapshot layer 730 of the storage architecture 700. In some embodiments, the layout file can also be used to mount the snapshot as a file-system for a virtualized environment. Further details on these maps in the layout file are provided in Section 1 with respect to maps 114 (FIG. 1). The control file identifies the sectors where the snapshot and the layout files are physically stored on the volume. The control file can be used during operating system booting to locate and read the snapshot file and layout file when the file-system drivers are not loaded yet.

Figure 9:
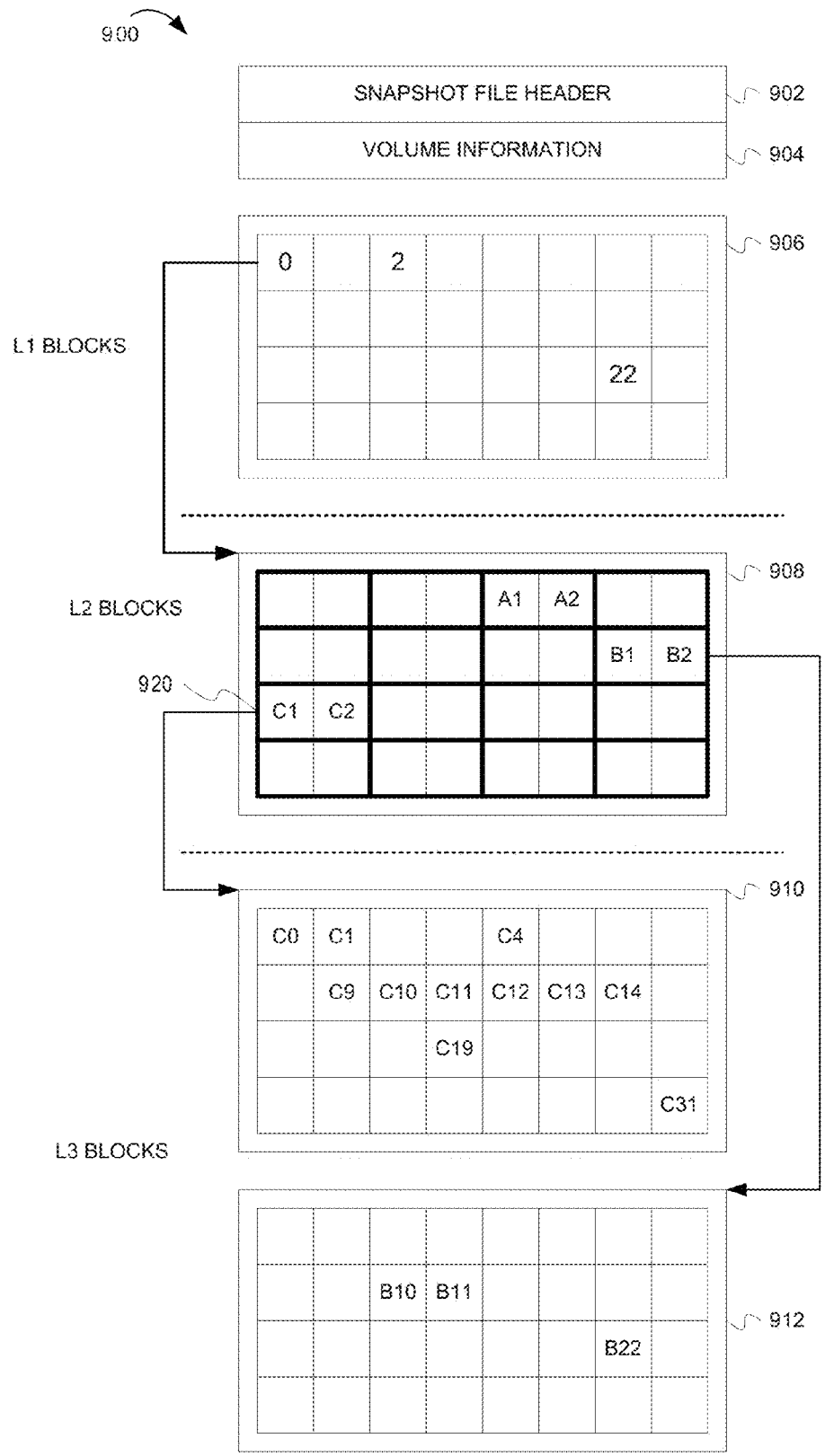
FIG. 9 is a block diagram illustrating a snapshot file structure according to embodiments.

FIG. 9 is a block diagram illustrating a snapshot file structure 900 according to embodiments. In some embodiments, the snapshot file structure 900 can include a snapshot file header 902, volume information 904, L1 (Layer 1) blocks 906, L2 (layer 2) blocks 908 and L3 (layer 3) blocks 910. In some embodiments, the snapshot file header can include a file identifier, a file format version, flags indicating features or aspects of the snapshot, a GUID (global unique identifier) associated with the snapshot, creation time, etc. When a snapshot file is opened, its structure can be validated (i.e., IDs/version/flags can be checked) to insure that the data in the snapshot is valid and can be interpreted properly.

In some embodiments, volume information 904 can include volume information identifying and/or describing the source volume associated with the volume snapshot (i.e., volume sector size, no. of sectors per cluster, disk number, volume offset, volume length, volume GUID, etc.) When a computer starts, the snapshot file can be read and compared to the source volume to determine if volume structure is the same. This can be useful to detect that the user replaced a physical volume after the snapshot was created, in which case the snapshot file will not match the volume. The L1 blocks 906 contain entries that index into the L2 blocks. The number of L1 blocks can be calculated during creation of the volume snapshot. The number of entries in the L1 blocks is the number of blocks needed to store the contents of the volume when fully expanded. For example, a 2-GB volume image that uses 2 MB blocks requires 1024 L1 entries. In some aspects, an entry is four bytes long and points to an entry in the L2 section. All unused table entries in the L1 blocks are initialized to zero. In some aspects, the creation and/or initialization of the L1 blocks 906 can be deferred until the first write to the snapshot file.

Continuing with the example of a 2-GB volume with 2-MB blocks, when the file-system 720 (FIG. 7) writes a data block into a volume offset represented by interval <0, 2 MB>, the first L1 block is marked as occupied and points to a newly allocated L2 section (the L2 section describes data only for this volume region, i.e. <0, 2 MB>). Each entry is eight bytes long and consists of two parts: a pointer to an L3 section and a bit field how the L3 section is used (i.e., occupied by data blocks).

When creating a snapshot file, the L1, L2 and L3 section size can be calculated according to the volume size. Using the example above, the L1 section is divided into groups of 2-MB blocks. Entry "0" of the L1 section describes blocks in the <0, 2 MB> range, entry "1" describes blocks in the <2, 4 MB> range, entry "2" describes blocks in the <4 MB, 6 MB> range, etc. Each 2-MB block is described by an L2 section and each pair [A1, A2] in the L2 section describes a 16-KB block of a 2-MB block. The pair consists of two parts: a pointer to an L3 section and a bit field how the L3 section is used. Each L3 section contains a 16-KB block (i.e. 32 blocks by 512 bytes, C1 to C32). One of ordinary skill in the art having the benefit of the disclosure will appreciate that the above-mentioned sizes could vary according to different sector sizes, disk configurations and performance considerations.

Example of a Snapshot Write

Assume that the file-system 720 performs an initial write of six 512 byte sectors (3 KB=6*512=3072 bytes) to a volume at offset 135680. To calculate the L1 section position, the following formula can be used:

$$L1 \text{ index} = \text{floor}(\text{VolumeOffset}/L1 \text{ BlockSize}) \quad (1)$$

where: floor(x) rounds argument x down, VolumeOffset=135680, and L1 Blocksize is 2 MB (i.e., 2097152=2*1024*1024). Using formula 1, the L1 index is 0. Entry 0 of the L1 section 906 is marked as used, and the index value at entry 0 can be set to point at a newly allocated L2 section 908. The position inside the L2 section can be calculated using the following formula:

$$L2 \text{ index} = \text{floor}((\text{VolumeOffset} \% L1\text{BlockSize})/L2\text{BlockSize}) \quad (2)$$

where: the '%' operator yields the remainder from the division of the first expression by the second. The L2BlockSize is 16 KB (16*1024=16384). In this example, the L2 index is therefore 8:

$$L2 \text{ index} = \text{floor}((135680 \% 2097152)/16384)$$
$$= \text{floor}(135680/16384)$$
$$= \text{floor}(8.28125)$$
$$= 8$$

In L2 section 908, at L2 index position 8, the [C1, C2] pair of entry 920 is marked as used. The C1 value can point to a newly allocated L3 section 910 and the C2 value can be a bit field used to indicate how the newly allocated L3 section 908 is occupied. An offset into the newly allocate L3 section can be calculated using the following formula:

$$L3\ index = \mathrm{floor}((\mathrm{VolumeOffset}\ \%\ L1\mathrm{BlockSize})\ \%\ L2\mathrm{BlockSize})/L3\mathrm{BlockSize} \quad (3)$$

where: L3BlockSize is the sector size (i.e., the smallest chunk a drive can read, set to 512 bytes (or 4 KB for modern hard drives)). The L3 index is therefore 9:

$$\begin{aligned} L3\ index &= \mathrm{floor}(((135680\ \%\ 2097152)\ \%\ 16384)/512 \\ &= \mathrm{floor}((135680\ \%\ 16384)/512) \\ &= \mathrm{floor}(4608/512) \\ &= 9 \end{aligned}$$

Thus, for the original six sectors, file-system 720 is going to replace, will be stored in the snapshot file on these positions:
L1 index=0
L2 index=8
L3 index=9
i.e. blocks C9 to C14 will contain original data blocks.

The initialization of the C2 field of entry 920 of the L2 section 908 will now be discussed. As described above, the C9 to C14 data blocks within L3 section 910 will be used to store the data for the six data blocks. The allocation of blocks in the entire L3 section 910 can be described using a bit field, indicating which sectors contain valid data (e.g., bit set to 1) and which sectors are unused (e.g., bit set to 0). In the example, C2 will contain the value 0x007E0000 indicating that the $9^{th}$ to the $14^{th}$ blocks are used in the L3 section 910 of the snapshot file.

Figure 10:
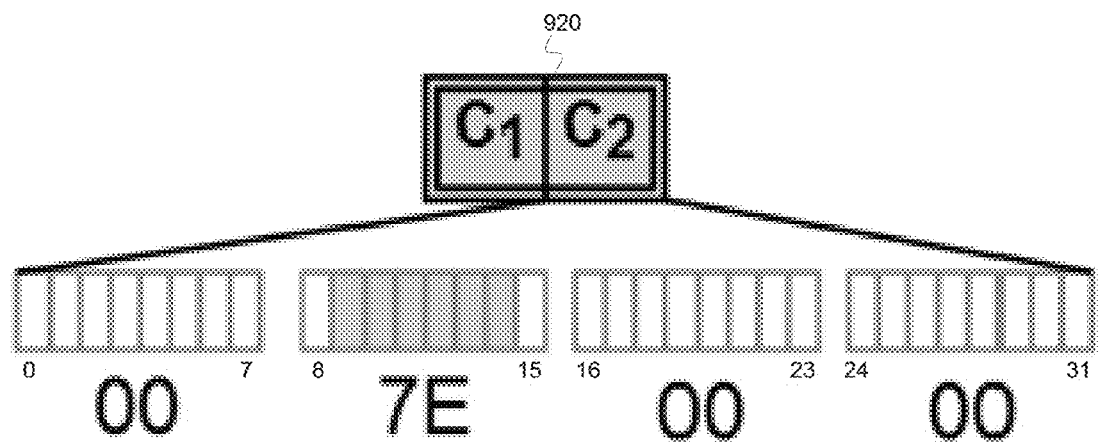
FIG. 10 is a block diagram illustrating a snapshot bit field according to embodiments.

FIG. 10 is a block diagram providing a pictorial view of the bit field C2 in the above example. As illustrated in FIG. 10, bits 9-14 are set to "1" (indicated by shading) to indicate the blocks are allocated.

Returning to the example illustrated in FIG. 9, should file-system 720 write the six sectors (whatever content they have) again at the same volume position, there is no need to backup the original data blocks, because they are already present in the snapshot file.

The snapshot file's maximum size is defined as the number of all monitored sectors (where in the worst-case scenario all monitored sectors are replaced). Whenever file-system 720 writes data sectors to a volume location that is monitored, the L1, L2 and L3 indexes can be calculated per the above formulas to determine if original data are already present in the snapshot file, and/or if new L2 or L3 sections need to be allocated. In some aspects, in order to speed up working with the snapshot file, L1 and L2 information are cached in the memory. L1 can be implemented in memory as a bit field with an auxiliary AVL tree (Georgy Adelson-Velsky and Evgenii Landis' tree, named after the inventors) and L2 can be implemented as an AVL tree. L3 information may not be cached, because the L3 layer contains only original data stored in the snapshot file.

Figure 11:
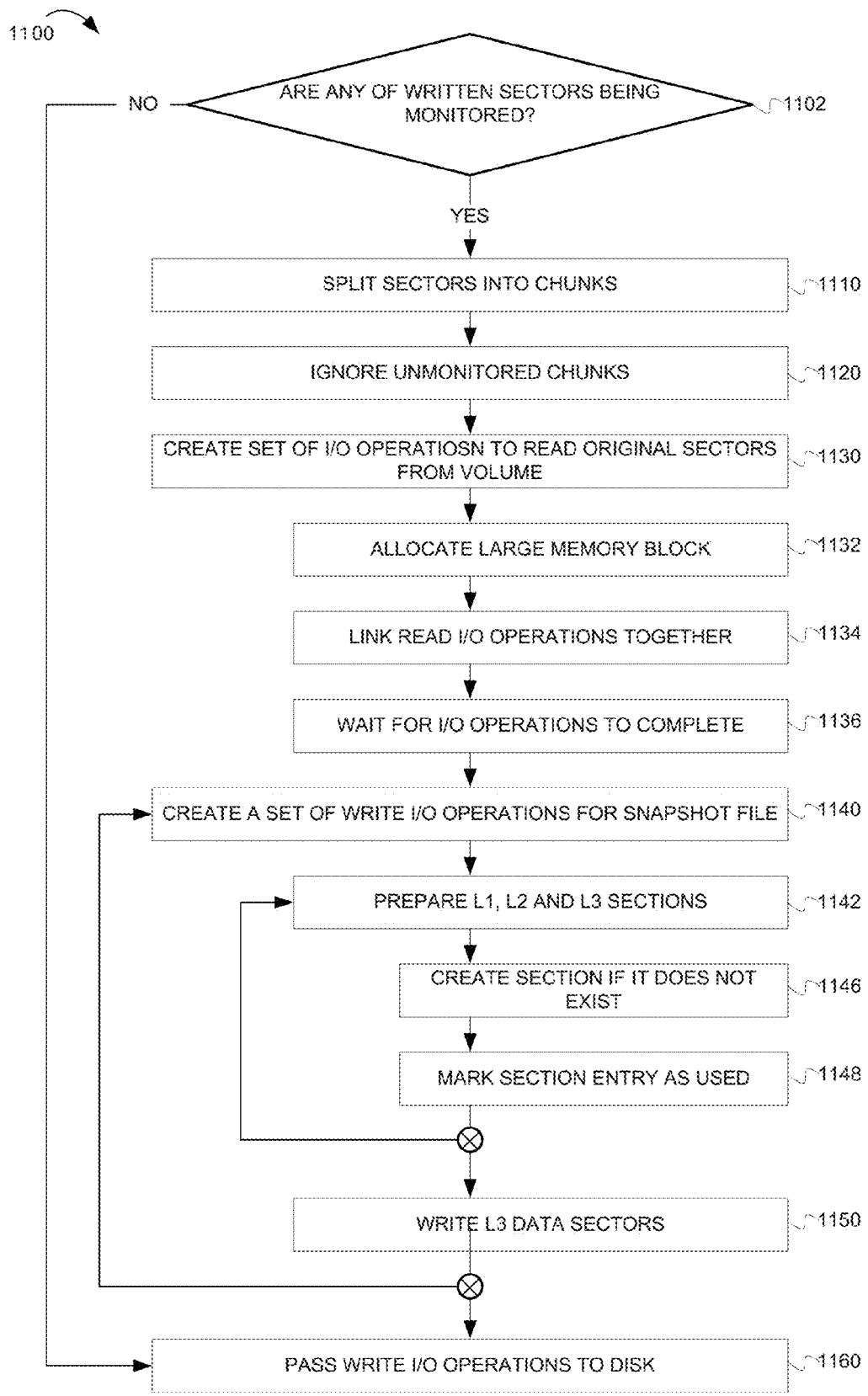
FIG. 11 is a flowchart illustrating operations of a method for writing to a volume having an associated snapshot according to embodiments.

FIG. 11 is a flowchart illustrating operations of a method 1100 for writing to a volume having an associated snapshot according to embodiments. The flow chart will be discussed in the context of the example write of six sectors discussed above. At block 1102, the volume snapshot layer 730 checks to see if at least one sector of the sectors to be written is a monitored sector (i.e., a sector that may need to be copied to the snapshot file). If none of the sectors are monitored, then the method proceeds to block 1160 to write the sectors to the target volume.

If the check at block 1102 determines that at least one sector is a monitored sector, then at block 1110, the write request may be internally split into several write requests. The write request may be split in the case that not all of the six sectors are monitored. The write request may be split as needed between monitored sectors and unmonitored sectors.

At block 1120, sectors that are not monitored can be ignored for the purposes of the operations of blocks 1130-1136. It should be noted that the write request for the ignored sectors cannot be passed to disk before backup of the original sectors that this write request will rewrite.

At block 1130, a set of I/O requests are created to read the original data for the monitored sectors. Because the write request can be split into several writes between ignored sectors and noncontiguous monitored sectors, the original sectors will be read from the volume from the volume also with one or more read requests.

At block 1130, a memory block is allocated for the read requests. In some aspects, all read requests can be read into one big allocated memory block (there is no need to allocate one memory block per read request).

At block 1134, the read I/O requests are linked together. In the case that one of the read fails, the entire read process can be invalidated based on the linkage.

At block 1136, the volume snapshot layer 730 waits for all of the linked reads to complete.

With the output memory buffer allocated at block 1132 filled with the original sectors from the volume, the original sectors can then be backed up (i.e., written) to the snapshot file. This backup process can be asynchronous, such that the volume layer 730 need not wait for the original sectors to be stored in the snapshot file before continuing.

At block 1140, a set of one or more write I/O requests to write the original sector data to the snapshot file are created. According to the internal snapshot structure, the largest block that can be written to the snapshot file in the example discussed above is 16 KB (the length of an L3 section 910). Therefore, multiple snapshot file write I/Os can be created. At block 1142, the data for the L1, L2 and L3 sections such as the offset data and bit field data are determined using formulas 1-3 above.

At block 1146, new L2 and L3 sections may be created. For example, sometimes for a new L3 section 910, a new L2 section 908, and optionally L1 section 906 may need to be created. Modifying an existing L3 section 910 can lead to updating L2 section 908 (C2 value, bit field), etc. The worst case scenario exists when no L1, L2 or L3 section has been created yet. If the snapshot file already contains L1, L2 and L3 sections, or L3 section already contains original sectors, then it is not necessary to issue any writes to the snapshot file.

If writes to the snapshot section are performed, at block 1148 the sectors to be written are marked as used in the corresponding L1 and L2 sections.

At block 1160, once the original sectors have been backed up into the snapshot file, the write requests to the volume can be passed down to the disk. The sectors on disk will be rewritten, but the snapshot file will contain the original sector data.

Figure 12:
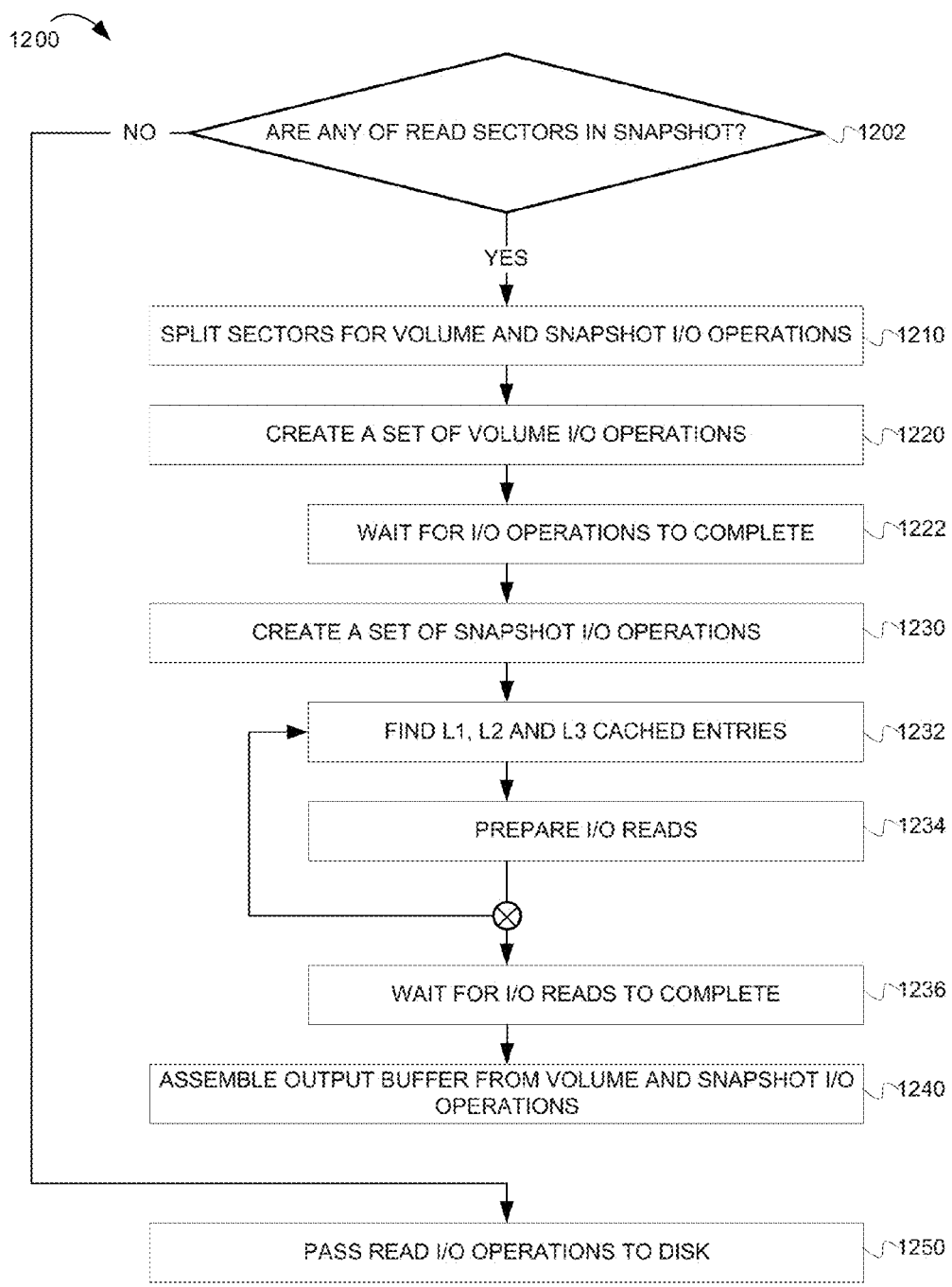
FIG. 12 is a flowchart illustrating operations of a method for reading from a volume having an associated snapshot according to embodiments.

FIG. 12 is a flowchart illustrating operations of a method 1200 for reading from a volume having an associated snapshot according to embodiments. Reading from a volume snapshot device returns data at the point in time the snapshot was created. In FIG. 11, the method 1100 was described using an example backup of six sectors to the snapshot file followed by a write of the six sectors to the volume. For FIG.

12, method 1200 will be discussed in the context of an example read of ten sectors, some of which are in the snapshot file.

At block 1202, the volume snapshot layer 730 checks if at least one of the read sectors was backed up. Using the fact that L1 and L2 are cached in memory, this check can be very fast. If none of sectors to be read are stored in the snapshot file, then the entire read I/O request can be passed down to disk at block 950.

At block 1110, the read sectors are split between those volume sectors that are stored in the snapshot file and those that are not in the snapshot file.

At block 1120, it is determined how many sectors (if any) are to be read directly from the volume (i.e., sectors that contain original data). A set of volume read I/O requests are created.

At block 1122, the volume snapshot layer 730 waits for the read requests created at block 1120 to complete.

At block 1130, once all volume I/O read requests are complete, a set of snapshot I/Os are created to read the rest of sectors from the snapshot file.

At block 1132, snapshot file offset are determined using cached L1 and L2 entries in memory.

At block 1134, using the snapshot file offsets determined at block 1132, read snapshot I/Os are created. Since the largest block we can read from the snapshot file is 16 KB (the length of an L3 section 910), multiple snapshot I/Os can be created.

At block 1136, the volume snapshot layer waits for the snapshot I/O requests to complete.

At block 1140, once all snapshot I/Os are read, the output buffer now contains merged data from volume and snapshot file. The read operation is completed and data are returned to the application.

In addition to reads and writes of the snapshot file, several issues may arise during snapshot volume operations. These issues include snapshot file resize, rebooting, and mounting partial snapshots.

Snapshot File Resize

When a snapshot volume driver 930 backs up new data, the snapshot space may need to be extended. This can be done in various ways. In a first aspect, where all the involved parties are satisfied, the owner of the snapshot file can interact with file system to make it evident who owns volume snapshot space (i.e. snapshot file). To resize the snapshot file, the underlying file system layer 720 (FAT32, NTFS, etc.) can be requested to perform the resize operation. The file system layer 720 knows which empty volume space can be newly assigned to the snapshot file, and can modify several internal file system structures to reflect this change. This may not be clear at first sight, but looking at Windows storage volume again, volume Snapshot 730 is laying under file system layer 720 and processing its requests. Therefore, volume snapshot driver 730 may not be able to arbitrarily request that the file system driver 720 start resizing the snapshot file, because, as noted above, file resize operation can involve several internal file system structures modifications which could lead to a deadlock. Thus in some aspects, file resizing operations can be done in a separate thread in the background.

In other aspects, the snapshot space can be hidden from file system to simplify a snapshot space resize operation, but this can lead to compatibility issues with some applications.

Rebooting

At the end of rebooting phase, the file-system driver 720 may be stopped and thus won't process any file system write requests anymore (these requests will fail with STATUS_TOO_LATE error). This time period may be small, but may need to be handled. Possible volume writes must be backed up, but the problem arises that the snapshot file may not be able to be resized because file-system driver 720 is shutting down. Similarly, during the Windows boot process the time when the file-system driver 720 is loaded can be delayed until some disk recovery/repair tools finish processing. It is considered desirable for these discovery/repair tools to start before file-system driver 720, because the volume may not be used heavily. The tools can run for tens of minutes and a many volume writes can be generated. In some aspects, to backup possible volume changes of monitored sectors, the snapshot file can be resized (i.e., made larger) before rebooting process, when file-system driver 720 is still running. For example, the snapshot file may be resized by adding hundreds of megabytes to have a reserved snapshot file space available for possible volume writes. After reboot, when the file system driver 720 is loaded, the snapshot file can be resized to shrink it back to its ordinary size. In the case that there are too many volume changes and the snapshot file wasn't able to hold enough data, the snapshots can be deleted. This is not a serious issue because they can be recreated when the operating system is reloaded.

Mounting Partial Snapshots for Virtualized Environment

Monitoring volume changes can be merely a first prerequisite for creating a fully working virtual hard disk for a guest OS. If this virtual hard disk should be really a subset of the host hard disk, it is desirable to recreate a file system internal structure connecting data sectors for files and folders. The virtual hard disk typically contains fewer files than the host hard disk. When these changes are done, the reconstructed virtual hard disk can be mounted to guest OS. The volume snapshot driver can combine all three maps (redirected sectors, modified sectors and remapped sectors) in order to be able to create a snapshot volume driver which can be then mounted by guest OS.

Although the aspects of the inventive subject matter have been described in the context of providing a partial snapshot in a virtualized environment, for example, a partial snapshot of a virtual disk of a virtual machine, the embodiments are not so limited. For example, the systems and methods described above can be applied as well to physical volumes such that a partial snapshot is created of a physical volume. In particular, the folders and files of the physical volume that are to be included in the partial snapshot could be identified (e.g., via a user interface or command line interface) and some or all of the systems and methods described above could be used to create and maintain the partial snapshot.

III. Example Computer System

Figure 13:
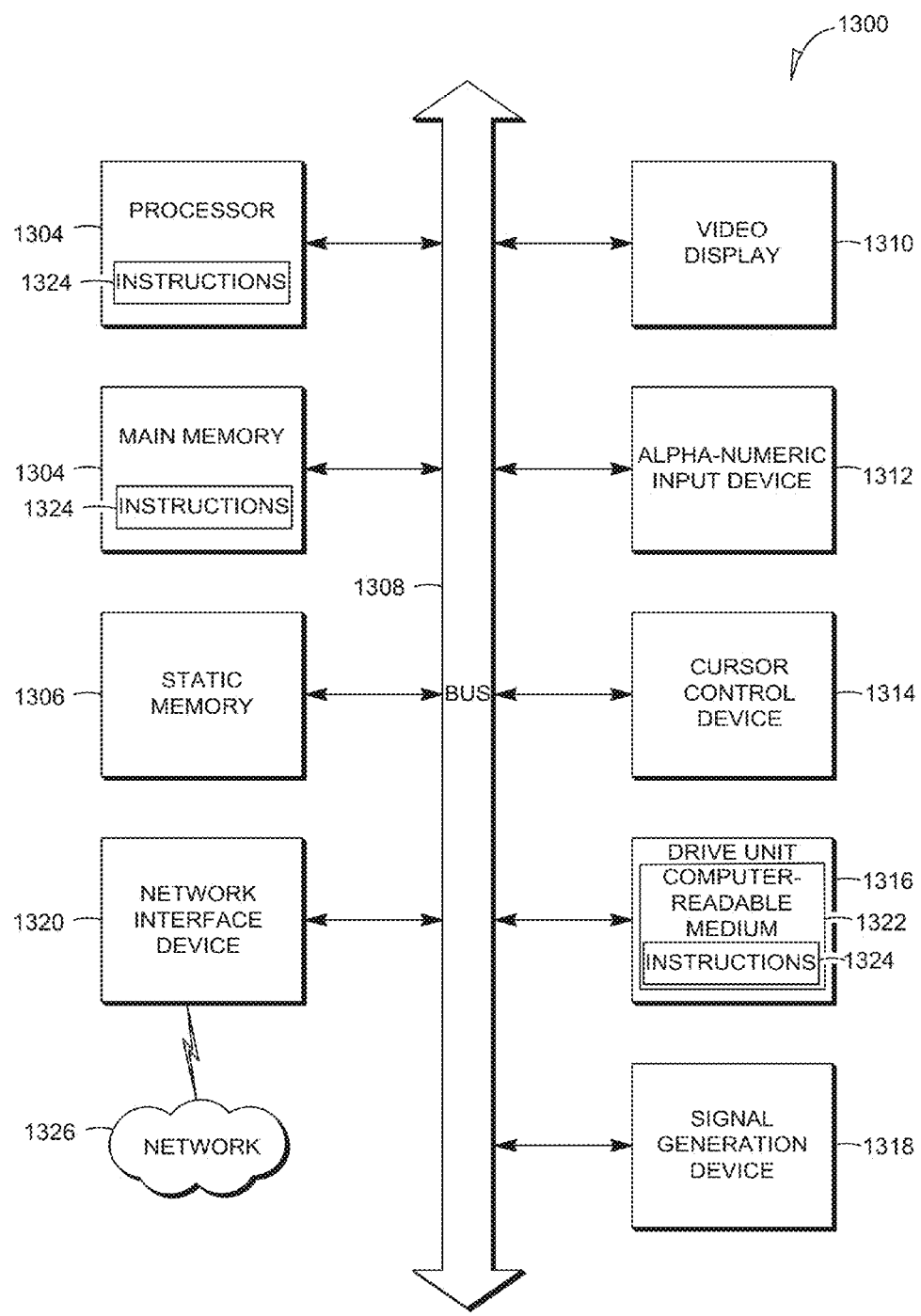
FIG. 13 is a block diagram of an example embodiment of a computer system upon which embodiments of the inventive subject matter can execute.

FIG. 13 is a block diagram of an example embodiment of a computer system 1300 upon which embodiments of the inventive subject matter can execute. The description of FIG. 13 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 13 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are preformed by I/O remote processing devices that are linked through a communications network. In a distributed computing environment, program modules may be located in both local and remote memory storage devices.

In the embodiment shown in FIG. 13, a hardware and operating environment is provided that is applicable to both servers and/or remote clients.

With reference to FIG. 13, an example embodiment extends to a machine in the example form of a computer system 1300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 1300 may include a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). In example embodiments, the computer system 1300 also includes one or more of an alpha-numeric input device 1312 (e.g., a keyboard), a user interface (UI) navigation device or cursor control device 1314 (e.g., a mouse), a disk drive unit 1316, a signal generation device 1318 (e.g., a speaker), and a network interface device 1320.

The disk drive unit 1316 includes a machine-readable medium 1322 on which is stored one or more sets of instructions 1324 and data structures (e.g., software instructions) embodying or used by any one or more of the methodologies or functions described herein. The instructions 1324 may also reside, completely or at least partially, within the main memory 1304 or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 1324 may further be transmitted or received over a communications network 1326 using a signal transmission medium via the network interface device 1320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for maintaining a partial snapshot of a volume, the method comprising:
　receiving an indication of a volume and one or more files on the volume that are to be included in the partial snapshot of the volume;
　in response to receiving a request to write updated data for one or more changed block locations to the volume, determining if a changed block location of the one or more changed block locations is associated with at least one file of the one or more files included in the partial snapshot;
　in response to determining that the changed block location is associated with at least one file of the one or more files included in the partial snapshot, reading original data from the volume at the changed block location, and writing the original data to a partial snapshot file comprised of a plurality of data sections including a first level section having a first plurality of fields and a plurality of second level sections, each of the second level sections having a pointer field and a block usage field;
creating a first entry at a first index in the first level section, the first entry pointing to a second entry in a second level section of the plurality of second level sections;
updating a pointer field of the second entry to point to a data section of the plurality of data sections and updating a block usage field of the second entry to indicate blocks used in the data section to contain the original data; and
writing the updated data to the one or more changed block locations of the volume.

2. The method of claim 1, wherein each of the data sections is associated with a portion of the volume, and wherein writing the original data to the partial snapshot file includes:
determining, based on a first offset identifying the changed block location in the volume, an original data section of the plurality of data sections for storing original data and to write the original data;
determining a second offset into the original data section based, at least in part, on the first offset; and
writing the original data to the original data section at the second offset.

3. The method of claim 2, further comprising:
determining if the original data section has been created in the partial snapshot file; and
in response to determining that the original data section has not been created, creating an original data section in the partial snapshot file.

4. The method of claim 1, further comprising:
determining the first index to the first entry based on the first offset and a first block size of the first level section.

5. The method of claim 1, further comprising:
determining a second index to the second entry based on the first offset, a first block size of the first level section and a second block size of the second level section.

6. The method of claim 1, further comprising:
determining the second offset based on the first offset, a first block size of the first level section, a second block size of the second level section, and a third block size of the data section.

7. A non-transitory machine-readable medium having stored thereon instructions, that, when executed by one or more processors, cause the one or more processors to:
receive an indication of a volume and one or more files on the volume that are to be included in a partial snapshot of the volume;
in response to receipt of a request to write updated data for one or more changed block locations to the volume, determine if a changed block location of the one or more changed block locations is associated with at least one file of the one or more files included in the partial snapshot;
in response to a determination that the changed block location is associated with at least one file of the one or more files included in the partial snapshot, read original data from the volume at the changed block location, and write the original data to a partial snapshot file comprised of a plurality of data sections including a first level section having a first plurality of fields and a plurality of second level sections, each of the second level sections having a pointer field and a block usage field;
create a first entry at a first index in the first level section, the first entry pointing to a second entry in a second level section of the plurality of second level sections;
update a pointer field of the second entry to point to a data section of the plurality of the data sections and updating a block usage field of the second entry to indicate blocks used in the data section to contain the original data; and
write the updated data to the one or more changed block locations of the volume.

8. The non-transitory machine-readable medium of claim 7,
wherein each of the data sections is associated with a portion of the volume, and
wherein the instructions to write the original data to the partial snapshot file include instructions to:
determine, based on a first offset identifying the changed block location in the volume, an original data section of the plurality of data sections to write the original data;
determine a second offset into the original data section based, at least in part, on the first offset; and
write the original data to the original data section at the second offset.

9. The non-transitory machine-readable medium of claim 8,
wherein the instructions further comprise instructions to:
determine if the original data section has been created in the partial snapshot file; and
in response to a determination that the original data section has not been created, create an original data section in the partial snapshot file.

10. The non-transitory machine-readable medium of claim 7,
wherein the instructions further comprise instructions to:
determine the first index to the first entry based on the first offset and a first block size of the first level section.

11. The non-transitory machine-readable medium of claim 7,
wherein the instructions further comprise instructions to:
determine a second index to the second entry based on the first offset, a first block size of the first level section and a second block size of the second level section.

12. The non-transitory machine-readable medium of claim 7,
wherein the instructions further comprise instructions to:
determine the second offset based on the first offset, a first block size of the first level section, a second block size of the second level section, and a third block size of the data section.

13. A system comprising:
one or more processors;
a volume communicably coupled to the one or more processors, the volume comprising one or more disks; and
a non-transitory machine-readable medium communicably coupled to the one or more processors and having stored thereon instructions, that, when executed by the one or more processors, cause the one or more processors to:
receive an indication of the volume and one or more files on the volume that are to be included in a partial snapshot of the volume;
request to write updated data for one or more changed block locations to the volume, determine if a changed block location of the one or more changed block locations is associated with at least one file of the one or more files included in the partial snapshot;

in response to a determination that the changed block location is associated with at least one file of the one or more files included in the partial snapshot, read original data from the volume at the changed block location, and write the original data to a partial snapshot file comprised of a plurality of data sections including a first level section having a first plurality of fields and a plurality of second level sections, each of the second level sections having a pointer field and a block usage field;

create a first entry at a first index in the first level section, the first entry pointing to a second entry in a second level section of the plurality of second level sections;

update a pointer field of the second entry to point to a data section of the plurality of data sections and updating a block usage field of the second entry to indicate blocks used in the data section to contain the original data; and write the updated data to the one or more changed block locations of the volume.

14. The system of claim 13, wherein each of the data sections is associated with a portion of the volume, and wherein the instructions to write the original data to the partial snapshot file include instructions to:

determine, based on a first offset identifying the changed block location in the volume, an original data section of the plurality of data sections to write the original data;

determine a second offset into the original data section based, at least in part, on the first offset; and write the original data to the original data section at the second offset.

15. The system of claim 14, wherein the instructions further comprise instructions to:

determine if the original data section has been created in the partial snapshot file; and in response to a determination that the original data section has not been created, create an original data section in the partial snapshot file.

16. The system of claim 13, wherein the instructions further comprise instructions to:

determine the first index to the first entry based on the first offset and a first block size of the first level section.

17. The system of claim 13, wherein the instructions further comprise instructions to:

determine a second index to the second entry based on the first offset, a first block size of the first level section and a second block size of the second level section.

18. The system of claim 13, wherein the instructions further comprise instructions to:

determine the second offset based on the first offset, a first block size of the first level section, a second block size of the second level section, and a third block size of the data section.

* * * * *